(12) United States Patent
Gupta et al.

(10) Patent No.: US 7,551,801 B2
(45) Date of Patent: Jun. 23, 2009

(54) CLASSIFICATION OF COMPOSITE ACTIONS INVOLVING INTERACTION WITH OBJECTS

(75) Inventors: Rakesh Gupta, Mountain View, CA (US); Trupti Devdas Nayak, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/735,829

(22) Filed: Apr. 16, 2007

(65) Prior Publication Data

US 2007/0242873 A1 Oct. 18, 2007

Related U.S. Application Data

(60) Provisional application No. 60/792,917, filed on Apr. 17, 2006.

(51) Int. Cl.
*G06K 9/36* (2006.01)
(52) U.S. Cl. ..................................... 382/276
(58) Field of Classification Search ................. 340/255; 382/153, 155, 159, 195, 197, 201, 276; 700/47, 700/262; 701/59; 703/2; 706/12, 16, 20; 707/E17.06, E17.08; 901/3
See application file for complete search history.

(56) References Cited

U.S. PATENT DOCUMENTS

| 6,714,201 B1 | 3/2004 | Grinstein et al. |
| 2005/0157908 A1 | 7/2005 | Matsugu et al. |

OTHER PUBLICATIONS

Cs.sfu.ca, Recognizing Action at a Distance, http://w~,.cs.sfu.ca/-mori/research!p#pers/efros-iccv03.pdf, [online], [Retrieved from the internet on Dec. 14, 2007, dated Oct. of 2003], Retrieved from the Interenet.*

Cen Rao et al, "View-Invariant Representation and Recognition of Actions", International Journal of Computer Vision, Nov. 2002, pp. 203-226, vol. 50 No. 2, Kluwer Academic Publishers, The Netherlands.*

Odin.kvl.dk, Correlation optimized warping and dynamic time warping as preprocessing methods for chromatographic data, ,http:i/www.odin.kvl.dk.JNews letters/Q2 Q3 2005/newsOO2.pd~, [online], [Retrieved on Dec. 14, 2007, last revised on Mar. 23, 2004], Retrieved from the Internet ~:/iwww.odinkvl.dPJNews ietters/Q2 Q3 2005/news002pdf.*

(Continued)

*Primary Examiner*—Matthew C Bella
*Assistant Examiner*—Gregory F Cunningham
(74) *Attorney, Agent, or Firm*—Fenwick & West LLP; Mark Duell

(57) ABSTRACT

The present invention provides a method for using stored data associated with simple actions to identify and classify an observed composite action which comprises a combination of simple actions. Image data comprising the composite action is received and used to generate a feature vector, such as a combination of a horizontal translation, a vertical translation, a scale value and a skin detection value, that is associated with the composite action. Baseline reference vectors representing combinations of simple actions represented by stored reference data are then generated. The generated feature vector is then preprocessed to modify the feature vector towards a baseline reference vector describing a combination of simple actions. Each of the baseline reference vectors is then compared to the modified feature vector to determine the baseline reference vector and corresponding combination of simple actions that most accurately describes the composite action.

21 Claims, 6 Drawing Sheets

OTHER PUBLICATIONS

Cs.sfu.ca, Recognizing Action at a Distance, http://w-,.cs.sfu.ca/-mori/research!p#pers/efros-iccv03.pdf, [online], [Retrieved from the internet on Dec. 14, 2007, dated Oct. of 2003], Retrieved from theD-DInterene.*

Cen Rao et al, "View-Invariant Representation and Recognition of Actions", International Journal of Computer Vision, Nov. 2002, pp. 203-226, vol. 50 No. 2, Kluwer Academic Publishers, The Netherland.*

Cs.sfu.ca, Recognizing Action at a Distance, http://www.cs.sfu.ca/~mori/research/papers/efros-iccv03/pdf, [online], [Retrieved from the internet on Dec. 14, 2007, dated Oct. of 2003], Retrieved from the Interenet <URL: http://www.cs.sfu.ca/~mori/research/papers/efros-iccv03.pdf>.

Matthai Philpose, et al, "Inferring Activities from Interactions with Objects", Pervasive Computing, Oct.-Dec. 2004, pp. 50-57, Published by IEEE CS and IEEE ComSoc.

Odin.kvl.dk, Correlation optimized warping and dynamic time warping as preprocessing methods for chromatographic data, http://www.odin.kvl.dk/News_letters/Q2_Q3_2005/news002.pdf , [online], [Retrieved on Dec. 14, 2007, last revised on Mar. 23, 2004], Retrieved from the Internet <URL: http://www.odin.kvl.dk/News_letters/Q2_Q3_2005/news002.pdf>.

Robotics.bu.edu, Automatic Identification of Environmental Haptic Properties http://robotics.bu.edu/dupont/publications/99_Presence_pptyestim.pdf , [online], [Retrieved from the Internet on Dec. 14, 2007, accepted for publication as of Mar. 3, 1999], Retrieved from the Internet <URL: http://robotics.bu.edu/dupont/publications/99_Presence_pptyestim.pdf>.

Alan Fern et al, "Specific-to-General Learning for Temporal Events with Application to Learning Event Definitions from Video", Journal of Artificial Intelligence, Dec. 2002, pp. 379-449, Issue 17, AI Access Foundation and Morgan Kaufmann Publishers.

Cen Rao et al, "View-Invariant Representation and Recognition of Actions", International Journal of Computer Vision, Nov. 2002, pp. 203-226, vol. 50 No. 2, Kluwer Academic Publishers, The Netherlands.

PCT International Search Report and Written Opinion; PCT/US2007/66769, Aug. 12, 2008, 11 pages.

* cited by examiner

CLASSIFICATION OF COMPOSITE ACTIONS INVOLVING INTERACTION WITH OBJECTS

RELATED APPLICATIONS

This application claims priority from U.S. provisional application No. 60/792,917, filed on Apr. 17, 2006, which is incorporated by reference herein in its entirety.

FIELD OF THE INVENTION

This invention relates generally to machine learning, and more particularly to a system and method for identifying and classifying observed actions.

BACKGROUND OF THE INVENTION

Identification and classification of observed actions is of interest in machine learning applications as it provides an efficient mechanism for training robots to perform actions. For example, a robot can observe a person's interaction with an object and identify and store the actions that comprise the interaction. The stored data can then be used by the robot to later replicate the observed interaction. Some interactions, commonly described as compound actions, are comprised of combinations of simple actions performed sequentially. These composite actions are difficult to identify and classify for later performance by the robot. In particular, modeling, and recognizing composite actions is cumbersome as it requires data for each of many possible composite actions to be collected and stored.

Commonly, a robot uses a database including information about observed interactions to later perform those observed interactions. For example, the database includes data about actions which can be performed on an object, such as "pick up," "lift," "throw," "break," "give," etc. Including information about composite actions in such a database requires extensive training data and storage space because composite actions comprise multiple simple actions performed sequentially. However, data for simple actions, such as "push," "pull," "lift," "drop," and "put" can be readily collected and stored because of the limited number of simple actions and reduced amount of training data needed to accurately describe simple actions. Hence, it is more efficient to store data describing simple actions and to then determine the combination of stored simple actions corresponding to an observed interaction. This allows composite actions to be reproduced by sequentially performing the simple actions comprising a composite action.

Existing techniques for action recognition, as described in Fern, A., et al., "Specific-to-general learning for temporal events with application to learning event definitions from video," *Journal of Artificial Intelligence Research*, vol. 17, pp. 379-449 which is incorporated by reference herein in its entirety, hard-code algorithms into a system and determine support, contact and attachment relations between objects by applying the coded algorithms to video sequences. However, this technique has limited applicability as using hard-coded algorithms limits the types of actions that can be recognized. Another technique, as described in Rao, C., "View-invariant representation and recognition of actions," *International Journal of Computer Vision*, 50(2):203-226, which is incorporated by reference herein in its entirety, recognizes composite actions by representing speed and direction of hand trajectory; however, this technique cannot recognize some types of actions, such as those with minimal hand movement (e.g., "drop") and cannot model interaction between an object and a hand. An alternative technique, as described in Philipose, M., et al., "Inferring activities from interactions with objects," *IEEE Pervasive Computing*, pp. 50-57, which is incorporated by reference herein in its entirety, recognizes actions by tracking Radio-Frequency Identification (RFID) tags on a person's hand and objects; however, RFID-based approaches are invasive and require mounting transmitters and sensors on the observed person and objects. These existing approaches can only recognize a limited number of composite actions and cannot be readily modified to identify additional composite actions.

What is needed is a system and method for identifying and classifying observed actions using stored data associated with simple actions.

SUMMARY OF THE INVENTION

The present invention provides a method for using stored data associated with simple actions to identify and classify an observed composite action which comprises a combination of simple actions. In one embodiment, image data representing the composite action is received and used to generate a feature vector associated with the composite action. Stored reference data representing simple actions is then used to generate a plurality of baseline reference vectors each representing a combination of the simple actions. For example, the feature vector can comprise a concatenation of a horizontal translation, a vertical translation, a scale value and a skin detection value. The generated feature vector is then preprocessed to modify the feature vector towards a reference data. Each of the baseline reference vectors is then compared to the modified feature vector to determine the reference vector, and corresponding simple actions, that best describes the observed composite action. This allows the simple actions that comprise the composite action to be identified using reference data of simple actions.

In an embodiment, the feature vector is preprocessed by equalizing the length of the feature vector, such as by appending non-motion data to the feature vector so the feature vector has a specified length. A non-linear time-warping algorithm, such as correlation optimized warping or dynamic time warping is then applied to the feature vector. The non-linear time-warping algorithm compensates for temporal misalignment between the feature vector and a reference vector associated with a simple action.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
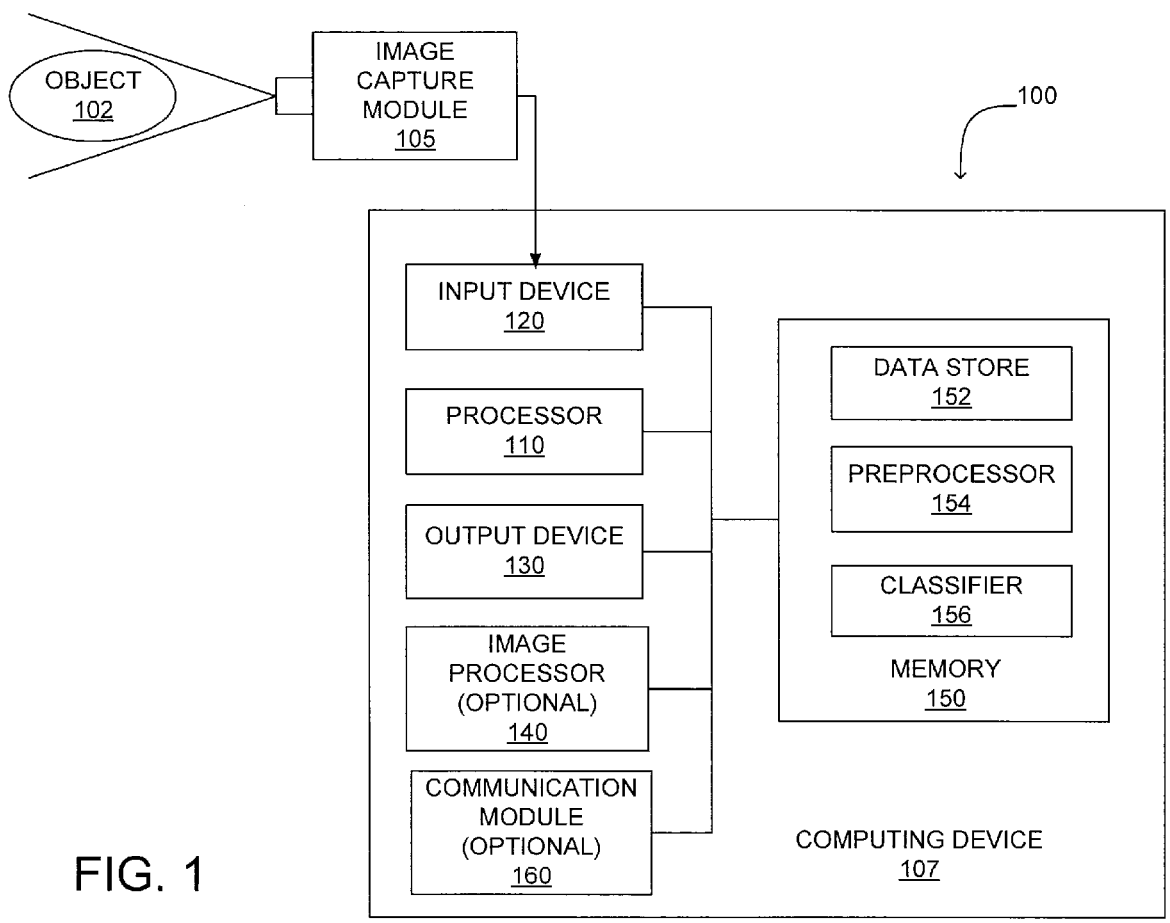
FIG. 1 is a computer system in accordance with one embodiment of the present invention.

A preferred embodiment of the present invention is now described with reference to the Figures where like reference numbers indicate identical or functionally similar elements. Also in the Figures, the left most digit of each reference number corresponds to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computer system 100 in which one embodiment of the present invention may operate. The computer system 100 comprises a computing device 107 and an image capture module 105. The computing device 107 includes a processor 110, an input device 120, an output device 130 and a memory 150. The input device 120 is adapted to communicate with the image capture module 105. In an embodiment, the computing device 107 also includes an image processor 140 or another specialized processor. In another embodiment, the computing device 107 further comprises a communication module 160 including transceivers or connectors.

An image capture module 105, such as a video camera or another video capture device capable of electronically capturing movement, captures image data describing the movement of an object 102 and transmits the captured data to the computing device 107. In an embodiment, the image capture module 105 detects movement of the object 102 by capturing a number of frames (e.g., 5 frames, 8 frames, 10 frames, etc.) each second, so the object 102 is continuously monitored. In an embodiment, the image capture module 105 also includes software or firmware that uses skin detection techniques, or other suitable methods, to determine whether a person's hand is in the frame and/or whether the person's hand is in contact with the object 102. Alternatively, the image capture module 105 transmits data of the movement of the object 102 to the computing device 107, which uses a processor 110, an image processor 140 or another specialized processor to determine the movement of the object 102, the presence of a person's hand or other data describing the object 102 movement.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 150, the input device 120, the output device 130 or the communication module 160.

The input device 120 is any device configured to provide user input to the computing device 107 such as a cursor controller or a keyboard. In one embodiment, the input device 120 can include an alphanumeric input device, such as a keyboard (e.g., a QWERTY keyboard), a key pad or representations of such created on a touch-sensitive screen, adapted to communicate information and/or command selections to processor 110 or memory 150. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 130 is also equipped with a touch screen in which a touch-sensitive, transparent panel covers the screen of output device 130.

In an embodiment, the computing device 107 also comprises an image processor 140 which receives input from the image capture module 105 and/or the memory 150. The image processor 140 comprises a processor that is specially designed for performing actions on video data to expedite video data processing. The image processor 140 allows the processor 110 to more rapidly perform data processing operations by processing the video data.

The memory 150 stores instructions and/or data that may be executed by processor 110. The instructions and/or data may comprise code for performing any and/or all of the techniques described herein. Memory 150 may be a dynamic random access memory (DRAM) device, a static random access memory (SRAM) device, Flash RAM (non-volatile storage), combinations of the above, or some other memory device known in the art. The memory 150 comprises a data store 152, a preprocessor 154 and a classifier 156, and is adapted to communicate with the processor 110, the input device 120, the output device 130, the image processor 140 and/or the communication module 160.

The data store 152 stores reference data describing simple actions. For example, the data store 152 includes data describing multiple simple, such as basic or rudimentary, actions (e.g., "push," "pull," "lift," "drop," "put," etc.). In an embodiment, the data describing the simple actions is stored as a feature vector describing how the simple action affects the object 102, such as describing the change in position of the object 102. Alternatively, the data store 152 includes video data showing a simple action being performed on the object 102. However, the above descriptions are merely examples and the data store 152 can include any information capable of describing or identifying simple actions.

The preprocessor 154 provides information about modifying data describing observed composite actions to more accurately compare the observed composite actions with stored reference data. As composite actions include multiple simple actions, the time to complete the constituent simple actions in a composite action may differ from the time to complete the simple action described by the stored reference data. Hence, concatenating independently performed simple actions requires a different time than the time to perform a composite action including a combination of related simple actions. The preprocessor 154 includes instructions for modifying data describing an observed action to compensate for these time differences, allowing observed actions to be more accurately compared to stored reference data. For example, the preprocessor 154 includes data describing how to perform dynamic time warping (DTW), correlation optimized warping (COW) or any other method for non-linearly modifying two data values (e.g., a reference value and an observed value). Although described above with regard to modifying temporal components, the preprocessor 154 can include instructions for compensating any characteristic of observed data that affects comparing the observed data to stored reference data.

The classifier 156 provides information on comparing observed data to stored reference data and determining the reference data most similar to the observed data. For example, the classifier 156 includes instructions for generating a composite action reference vector by combining stored reference data representing simple actions and for determining the generated composite action reference vector most similar to the observed data, such as by determining the minimum Euclidean distance between the generated composite action reference vector and the observed data. Alternatively, the classifier 156 can include instructions for decomposing an observed composite action into its component simple actions and for determining the stored reference data most similar to the simple actions comprising the observed composite action, such as by determining the minimum Euclidean distance between the stored reference data and the observed constituent simple actions. However, the above descriptions are merely examples and the classifier can include any information capable of determining the stored reference data that most closely resembles observed data.

In an embodiment, the computing device 107 further comprises a communication module 160 which links the computing device 107 to a network (not shown), or to other computing devices 107. The network may comprise a local area network (LAN), a wide area network (WAN) (e.g., the Internet), and/or any other interconnected data path across which multiple devices may communicate. In one embodiment, the communication module 150 is a conventional wired connection, such as USB, IEEE 1394 or Ethernet, to other computing devices 107 for distribution of files and information. In another embodiment, the communication module 160 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication. Alternatively, the communication module 160 comprises a combination of a transceiver and a wired connection.

It should be apparent to one skilled in the art that computing device 107 may include more or less components than those shown in FIG. 1 without departing from the spirit and scope of the present invention. For example, computing device 107 may include additional memory, such as, for example, a first or second level cache, or one or more application specific integrated circuits (ASICs). Similarly, computing device 107 may include additional input or output devices. In some embodiments of the present invention one or more of the components (110, 120, 130, 140, 150, 152, 154, 156, 160) can be positioned in close proximity to each other while in other embodiments these components can be positioned in geographically distant locations. For example the units in memory 140 can be programs capable of being executed by one or more processors 110 located in separate computing devices 107.

Figure 2:
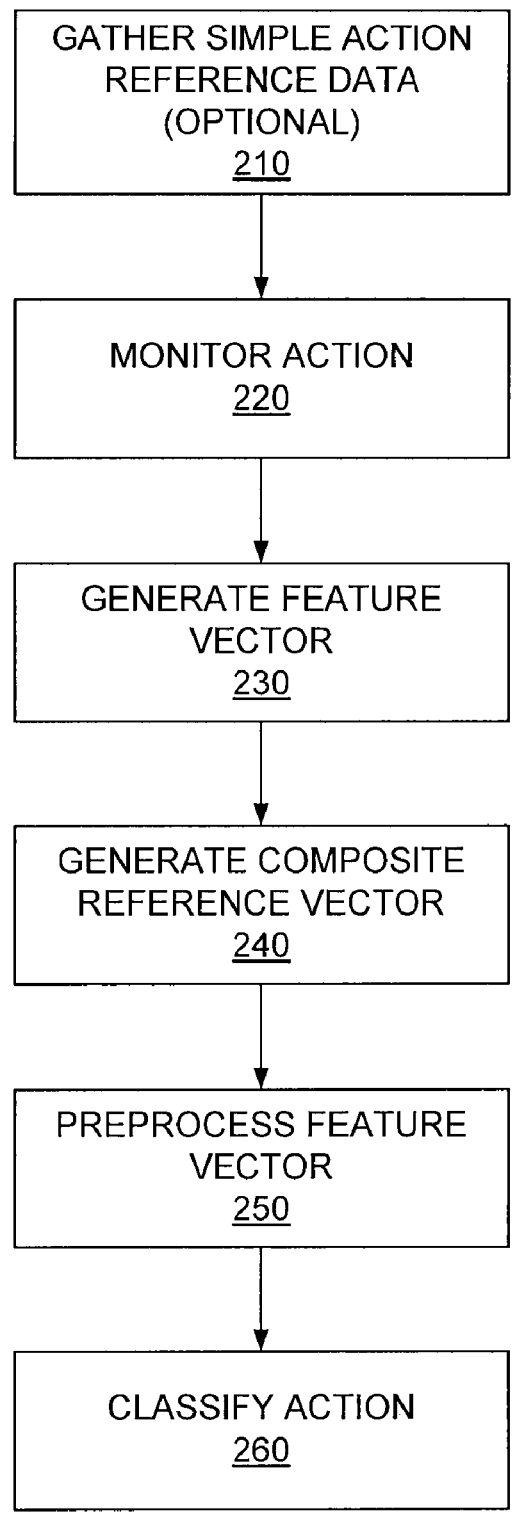
FIG. 2 is a flowchart illustrating a method for classifying an observed action according to one embodiment of the present invention.

FIG. 2 is a flowchart illustrating a method for classifying an observed action according to one embodiment of the present invention. In an embodiment, the computing system 100 initially gathers 210 reference data identifying simple actions. For example, reference data is gathered 210 for a set of simple actions (e.g., "pull," "push," "drop," "lift," "put," etc.) by recording simple actions performed on the object 102 using the image capture module 105 and storing the recorded data in the data store 152. In an embodiment, multiple instances of each simple action are recorded, stored and used to generate multiple feature vectors describing each simple action. Acquiring data for multiple instances of the simple actions allows the reference data to account for variations in the execution time of the simple actions. For example, simple actions are performed and multiple frames of image data are recorded, such as 5-10 frames per second or another suitable frame rate. Data, such as a horizontal transformation, a vertical transformation, a scale value and a skin detection value are computed using the recorded frame data and the computed values are concatenated to form a reference vector describing the simple action. In an embodiment, non-motion data, such as when data stops changing beyond a threshold, is removed from the reference vector to reduce the storage space for the reference vector. Alternatively, the computing device 107 receives data, such as feature vectors, describing the effect of simple actions on the object 102 from the input device 120, the communication module 160 or another source. The simple actions used for the reference data can be defined by a user using the above-described process or can be predefined and stored in the data store 152.

The computing system 100 then monitors 220 a composite action involving the object 102. The image capture module 105 records movement of the object 102, such as by recording multiple frames of image data, which the computing device 107 uses to generate 230 a feature vector describing the monitored composite action. For example, the computing device 107 computes a transformation matrix describing the object 102 movement and concatenates values from the transformation matrix, such as translation data and scale data, to generate 230 the feature vector. In an embodiment, the computing device 107 also uses skin detection techniques to determine whether a person's hand is in contact with the object 102 and includes data describing the intersection of the person's hand and the object 102 in the feature vector. In an embodiment, the generated feature vector includes horizontal translation data, vertical translation data, scale data and hand intersection data. In an alternate embodiment, the generated feature vector also includes data describing rotation of the object 102, or additional data describing movement of the object 102.

Baseline reference vectors representing combinations of simple actions are then generated 240 using the stored reference data. In one embodiment, simple actions are concatenated to generate 240 a baseline reference vector. Different baseline reference vectors represent different combinations of simple actions identified by the reference data, allowing multiple baseline reference vectors to represent multiple combinations of the simple action representations in the stored reference data. For example, if the reference data describes simple actions such as "pull," "push," "drop," "lift" and "put," baseline reference vectors are generated 260 representing composite actions such as "pull-lift," "push-lift," "pull-put," or other combinations of the simple actions described by the reference data. In an embodiment, baseline reference vectors for each combination of simple actions described by the reference data are generated 240. Alternatively, baseline reference vectors for a subset or specified number of the simple actions described by the reference data are generated.

The feature vector is then preprocessed 250 to compensate for temporal differences between the generated baseline reference vector and the monitored action. Because the interdependent simple actions comprising a composite action are completed in different times than independently performed simple actions concatenated together, preprocessing differently modifies the baseline reference vectors and the generated feature vector to compensate for these temporal differences. For example, preprocessing 250 uses a time-warping technique such as dynamic time warping (DTW) or correlation optimized warping (COW) to non-linearly modify the baseline reference vector and the generated feature vector. This non-linear modification allows computation of an optimal match between a baseline reference vector and the feature vector. In an embodiment, preprocessing 250 also appends non-motion data to the feature vector so the feature vector has a specified length. Appending data to the feature vector allows multiple feature vectors to have uniform lengths, simplifying subsequent processing.

Singular value decomposition (SVD), principal component analysis (PCA) or another decomposition technique is then used to determine the simple actions that comprise an observed composite action by comparing the observed composite action to the baseline reference vectors. In an embodiment, the feature vector is normalized to have zero mean and unit variance before comparison with the baseline reference vectors. In another embodiment, the generated baseline reference vectors are also normalized to have zero mean and unit variance. The component actions of the preprocessed feature vector are then compared to the generated baseline reference vectors to be classified 260. In an embodiment, the simple actions comprising a composite action are classified 260 by computing a distance vector including the Euclidian distance between the preprocessed feature vector and the baseline reference vectors. The component action is then classified 260 as the baseline reference vector having the minimum Euclidian distance from the preprocessed feature vector. However, the use of minimum distance to classify composite actions is merely an example, and any technique capable of determining correlation between the preprocessed feature vector and the baseline reference vectors can be used. This allows the simple actions comprising the observed composite action to be classified as the simple actions combined to generate the most similar baseline reference vector. The stored training data comprising simple actions is used to classify 260 an observed composite action. Hence, the composite actions can be reproduced by performing the simple actions in sequence.

Figure 3:
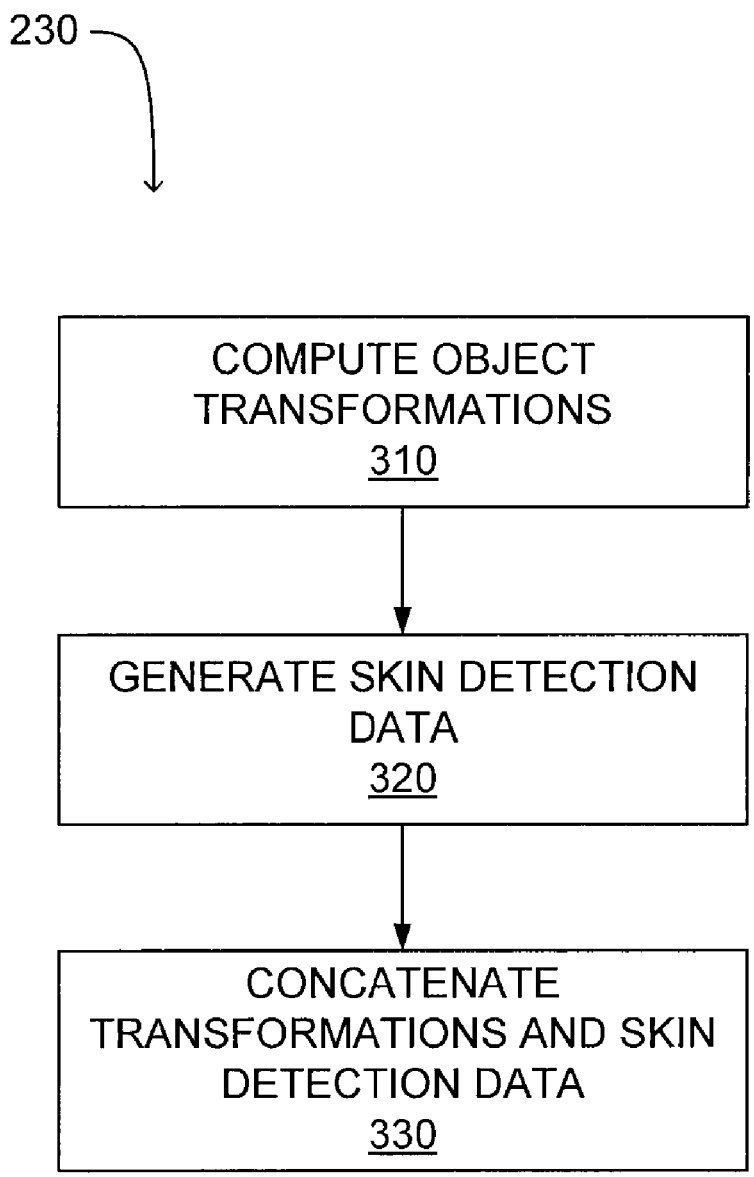
FIG. 3 is a flowchart illustrating a method for generating a feature vector describing an observed action according to one embodiment of the present invention.

FIG. 3 is a flowchart illustrating a method for generating 230 a feature vector describing an observed action according to one embodiment of the present invention. Initially, transformations describing the object 102 motion are computed 310. For example, the computing device 107 computes 310 transformations, such as a linear transformation, a rotation transformation and a scale transformation, when the object 102 is moved. Alternatively, a transformation matrix representing movement of the object 102, which can include data for horizontal movement, vertical movement, rotational movement, movement toward or away from the image capture module 105 or other suitable movements, is computed 310. In one embodiment, skin detection techniques are applied to generate 320 data indicating whether a person's hand is in the frame and/or is in contact with the object 102. In an embodiment, the generated skin detection data comprises a flag which describes hand position with reference to the object that allows the invention to distinguish between similar actions such as "drop" or "put." An example use of the skin detection flag is described in Table 1.

TABLE 1

Example skin detection data flag values.

| Flag Value | Hand Position |
|---|---|
| 0 | Hand is in the frame, but not in contact with the object. |
| −1 | Hand is not in the frame |
| Positive number >0 | Hand is in the frame and in contact with the object |

The skin detection data and data from the transformation are then concatenated 330 to form a feature vector. In an embodiment, a subset of the data from the computed transformation is concatenated 330 with each other and the skin detection data to form the feature vector. For example, rotation data is generally not used when the simple actions do not change the angle of the object 102. Thus, the feature vector includes data describing the horizontal and vertical motion of the object 102. Alternatively, the feature vector includes all data values computed by the transformation and the skin detection data.

Figure 4:
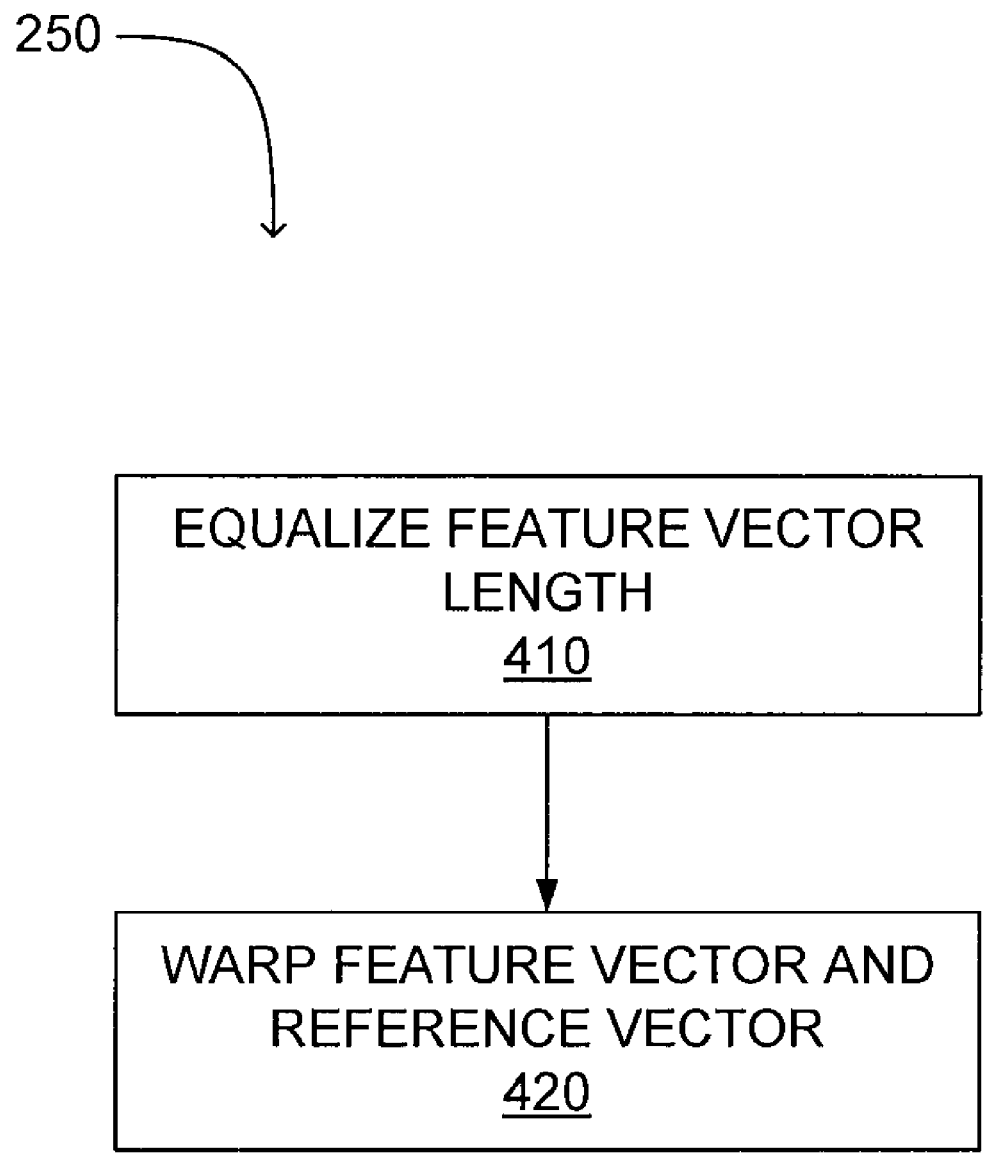
FIG. 4 is a flowchart illustrating a method for preprocessing a feature vector for comparison with a reference vector according to one embodiment of the present invention.

FIG. 4 is a flowchart illustrating a method for preprocessing 250 a feature vector for comparison with a reference vector according to one embodiment of the present invention. Because the time to complete simple actions varies depending on the action performed, different amounts of data are captured when different actions are performed. For example, an action such as "drop" is completed in less time than another action such as "put down," so less data is recorded and stored when a "drop" is performed. To simplify data processing, the feature vector length is equalized 410 to a substantially constant value. In an embodiment, non-motion data is appended to the concatenated transformation data and skin detection data to equalize 410 feature vector length, so that multiple feature vectors have substantially the same length.

The time needed to complete the inter-related simple actions comprising a compound action differs from the time needed to complete independently performed simple actions. This time difference affects comparison of the observed composite action to the baseline reference vector and can cause erroneous comparison results. Thus, the feature vector and reference vector are warped 420 to compensate for the misaligned temporal values. In an embodiment, the feature vector and reference data are non-linearly warped 420 to optimize comparison of the two. This warping 420 of the feature vector also minimizes distortion caused by the non-motion data appended for feature vector equalization. For example, dynamic time warping (DTW) or correlation optimized warping (COW) are used to differently scale the temporal components of the reference vector and the feature vector, increasing the accuracy of the comparison between feature vector and reference vector.

Figure 5:
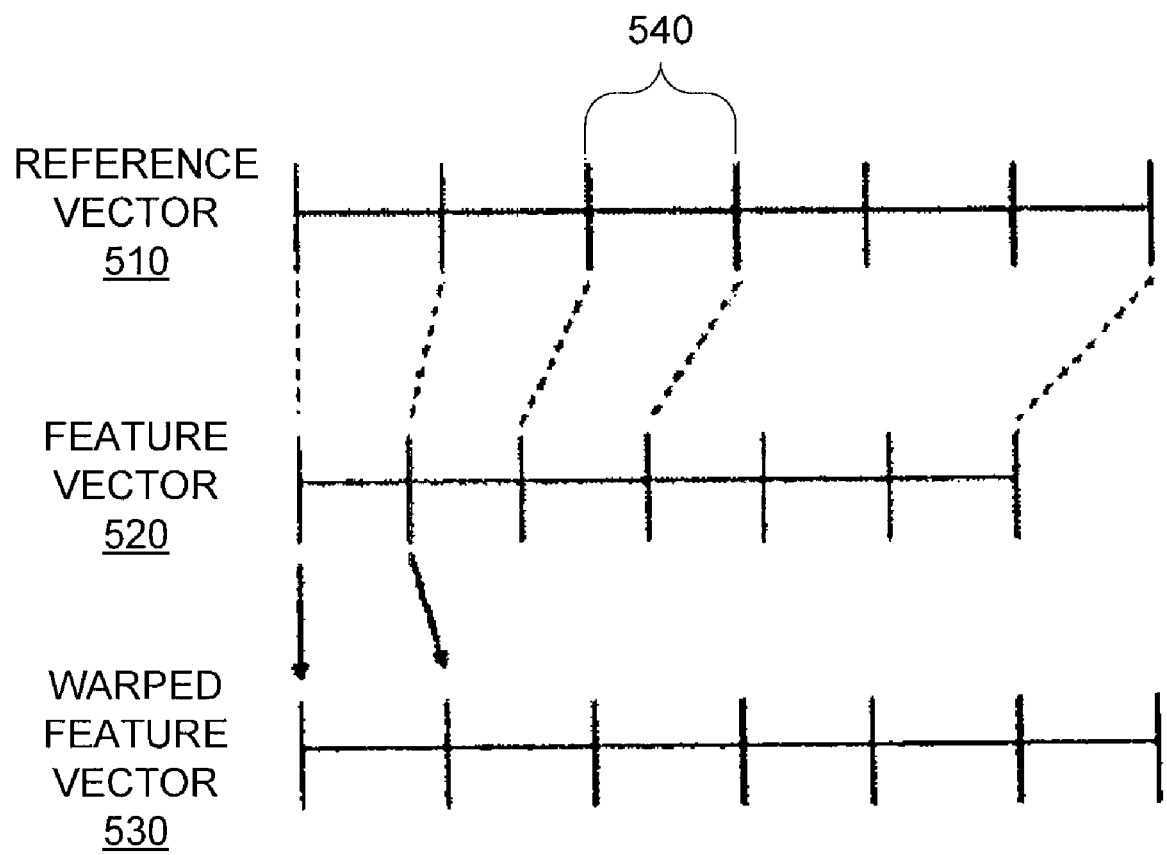
FIG. 5 is an example of comparing an observed composite action to a reference vector using correlation optimized warping (COW) according to one embodiment of the present invention.

FIG. 5 is an example of comparing an observed composite action to a composite action reference vector using correlation optimized warping (COW) according to one embodiment of the present invention. COW increases the accuracy of the comparison between feature vector and baseline reference vector by differently scaling the temporal components of the baseline reference vector and the feature vector.

COW divides data, such as a reference vector 510 and a feature vector 520, into segments 540 including one or more time points. In an embodiment, the segments 540 have equal lengths. Alternatively, the segments 540 have different or user-defined lengths. A slack parameter specifying the flexibility, or the amount by which the segment 540 lengths are increased or decreased, of the warped segments is also defined. In one embodiment, the slack parameter is calculated using linear interpolation and specifies the maximum length increase or decrease in a segment 540.

Segments 540 from the reference vector 510 are compared with segments 540 from the feature vector 520. If the compared segments 540 from the reference vector 510 and the feature vector 520 include a different number of time points, the segment 540 from the feature vector 520 is interpolated, using linear interpolation and the slack parameter, or another suitable interpolation technique, to generate a warped feature vector 530 so that segments of the warped feature vector 530 have the same or substantially the same number of time points as segments of the reference vector 510. This allows alignment of the compared segments by changing the segment 540 lengths of the feature vector 520.

In an embodiment, the segment lengths of the feature vector 520 are modified by multiple slack parameters, creating different warped feature vectors 530. Segments of the warped feature vectors 530 are then correlated with the segment lengths of the reference vector 510 to determine which warped feature vector 530 most closely matches the reference vector 520. Alternatively, additional data is also used to optimize the correlation. In an embodiment, correlation between the reference vector 510 and the feature vector 520 or the warped feature vector 530 is calculated using the formula:

$$p(n) = \frac{\text{cov}[r(n), s\{n\}]}{\sqrt{\text{var}\,[r(n)]\text{var}(s\{n\})}} \quad (1)$$

where:
r=the reference vector 510,
s=the feature vector 520, and
n=an index denoting the segments Hence, application of COW uses the number of segments 540 and the slack parameter to optimize comparison of the reference vector 510 and the feature vector 520 by generating a warped feature vector 530 that is used for the comparison. In an embodiment, the initial and final boundaries of the reference vector 510 and the feature vector 520 are fixed to align the first and last points in the vectors, simplifying application of COW.

Figure 6:
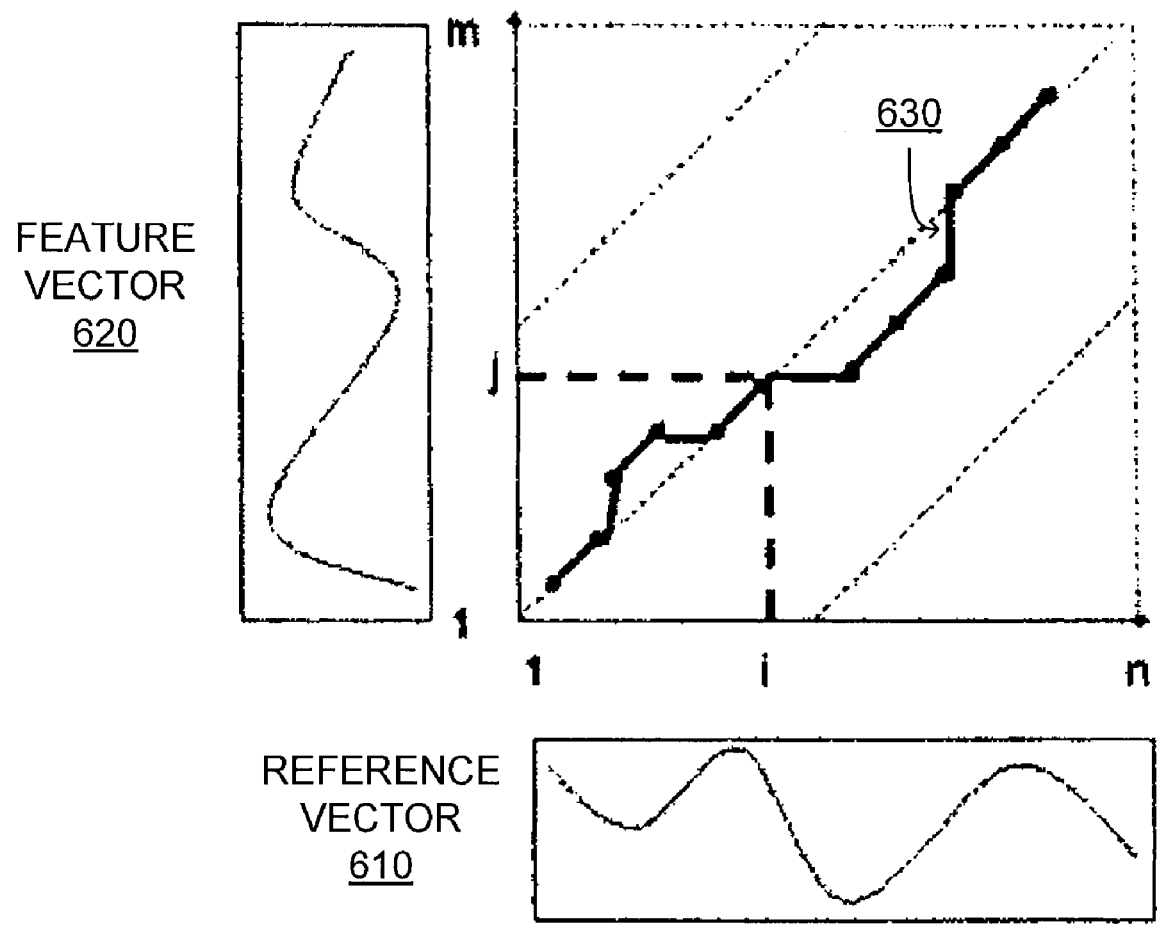
FIG. 6 is an example of comparing an observed composite action to a reference vector using dynamic time warping (DTW) according to one embodiment of the present invention.

FIG. 6 is an example of comparing an observed composite action to a reference vector using dynamic time warping (DTW) according to one embodiment of the present invention. DTW is a method for non-linearly warping two data values, such as a reference vector 610 and a feature vector 620 to find an optimal match between the data values.

In an embodiment, the reference vector 610 comprises N segments and the feature vector 620 comprises M segments. To optimally match the reference vector 610 and the feature vector 620, an N×M matrix is generated where the (ith, jth) element of the matrix comprises the Euclidean distance between the ith segment of the feature vector 620 and the jth segment of the reference vector 610. In another embodiment, the (ith, jth) element of the matrix comprises any value describing a comparison between the ith segment of the feature vector 620 and the jth segment of the reference vector 610.

The matrix is used to generate a warping path 630 which is used to alter the feature vector 620 for comparison with the reference vector 610. In an embodiment, the warping path 630 is generated by examining data from the matrix that is one value above and one value below the diagonal of the matrix. Data from this set that indicates the closest match between the feature vector 620 and the reference vector 610 (e.g., minimum distance between the vectors, maximum correlation value between the vectors, etc.) is included in the warping path 630. These values are concatenated to form the warping path 630 which is used to generate a warped feature vector 630 by multiplying the feature vector 620 by the warping path 630. The warped feature vector 620 is then compared to the reference vector 610. Hence, the warping path 630 is used to compensate for differences in the amount of data in the feature vector 620 and the reference vector 610 by scaling the temporal values of the feature vector 620.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-based method for classifying an observed composite action, wherein the observed composite action comprises a combination of simple actions, comprising the steps of:
   receiving image data representing the observed composite action;
   generating a feature vector from said image data;
   generating a plurality of baseline reference vectors by combining two or more representations of simple actions, wherein said representations of simple actions are stored in a computer storage device;
   preprocessing the feature vector to modify the feature vector towards a baseline reference vector to form a modified feature vector;
   comparing the plurality of baseline reference vectors to the modified feature vector; and
   classifying the combination of simple actions comprising the observed composite action as stored representations of simple actions which comprise a baseline reference vector having a highest correlation to the modified feature vector.

2. The method of claim 1, wherein the step of generating a feature vector comprises the steps of:
   computing a translation matrix representing a first movement in the composite action;
   computing a scale value representing a second movement in the composite action;
   computing a skin detection value indicating an interaction between a hand and an object in the composite action; and
   combining the translation matrix, the scale transformation and the skin detection value to generate the feature vector.

3. The method of claim 2, wherein the translation matrix comprises a horizontal translation and a vertical translation.

4. The method of claim 1, wherein the step of preprocessing the generated feature vector comprises the steps of:
   equalizing a length of the feature vector; and
   applying a non-linear time-warping algorithm to the feature vector.

5. The method of claim 4 wherein the step of equalizing the length of the feature vector comprises:
   appending data to the feature vector so the feature vector comprises a specified length.

6. The method of claim 4, wherein the non-linear time-warping algorithm comprises correlation optimized warping or dynamic time warping.

7. The method of claim 1, wherein the step of classifying the observed composite action comprises applying singular value decomposition or principal component analysis to the feature vector.

8. The method of claim 1, further comprising the steps of:
   receiving simple action image data representing a reference simple action;
   generating reference data from the received simple action image data; and
   storing the reference data in the computer storage device.

9. The method of claim 8, wherein the step of generating the reference vector comprises the steps of:
   computing a horizontal translation representing a horizontal movement in the simple action;
   computing a vertical translation representing a vertical movement in the simple action;
   computing a scale value representing a third movement in the simple action;
   computing a skin detection value indicating an interaction between a hand and an object; and
   combining the horizontal translation, the vertical translation, the scale value and the skin detection value.

10. The method of claim 9, further comprising the step of: removing non-motion data from the reference vector.

11. The method of claim 1, wherein the step of classifying each of the plurality of simple actions comprises the steps of:
   normalizing the modified feature vector to a zero-mean and unit-variance vector; and
   applying singular value decomposition or principal component analysis to the normalized vector.

12. The method of claim 1, wherein the step of comparing each of the baseline reference vectors to the modified feature vector comprises:
   computing a distance vector from each baseline reference vector and the modified feature vector.

13. The method of claim 12, wherein the baseline reference vector having the highest correlation to the modified feature vector comprises: a baseline reference vector having a minimum distance vector from the modified feature vector.

14. A computer program product, comprising a computer readable medium storing computer executable code for classifying a composite action, wherein the composite action comprises a combination of simple actions, the computer executable code performing the steps of:
   receiving image data representing the observed composite action;
   generating a feature vector from said image data;
   generating a plurality of baseline reference vectors by combining two or more representations of simple actions, wherein said representations of simple actions are stored in a computer storage device;
   preprocessing the feature vector to modify the feature vector towards a baseline reference vector to form a modified feature vector;

comparing the plurality of baseline reference vectors to the modified feature vector; and classifying the combination of simple actions comprising the observed composite action as representations of stored representations of simple actions which comprise a baseline reference vector having a highest correlation to the modified feature vector.

15. The computer program product of claim 14, wherein the step of generating a feature vector comprises the steps of:

computing a translation matrix representing a first movement in the composite action;

computing a scale value representing a second movement in the composite action;

computing a skin detection value indicating an interaction between a hand and an object in the composite action; and combining the translation matrix, the scale transformation and the skin detection value to generate the feature vector.

16. The computer program product of claim 14, wherein the step of preprocessing the generated feature vector comprises the steps of:

equalizing a length of the feature vector; and applying a non-linear time-warping algorithm to the feature vector.

17. The computer program product of claim 14, further comprising the steps of:

receiving simple action image data representing a reference simple action;

generating reference data from the received simple action image data; and storing the reference data in the computer storage device.

18. The computer program product of claim 14, wherein the step of classifying the observed composite action comprises the steps of:

normalizing the modified feature vector to a zero-mean and unit-variance vector; and applying singular value decomposition or principal component analysis to the normalized vector.

19. The computer program product of claim 16, wherein the non-linear time-warping algorithm comprises correlation optimized warping or dynamic time warping.

20. The computer program product of claim 14, wherein the step of comparing each of the baseline reference vectors to the modified feature vector comprises:

computing a distance vector from each baseline reference vector and the modified feature vector.

21. The computer program product of claim 20, wherein the baseline reference vector having the highest correlation to the modified feature vector comprises:

a baseline reference vector having a minimum distance vector from the modified feature vector.

* * * * *